3,654,299
NITROIMIDAZOLYL ANTIMICROBIAL AGENTS

Goro Asato, Titusville, and Gerald Berkelhammer, Princeton, N.J., assignors to American Cyanamid Company, Stamford, Conn.
No Drawing. Filed Dec. 8, 1969, Ser. No. 883,237
Int. Cl. C07d 49/36
U.S. Cl. 260—309                                11 Claims

ABSTRACT OF THE DISCLOSURE

Substituted nitroimidazoles are prepared, for example, by reacting 2-cyano-1-substituted-5-nitroimidazole with hydroxylamine to produce the corresponding 1-substituted - 5 - nitro-2-imidazolecarboxamidoxime. The latter compound may be reacted with a loweralkyl haloformate to produce 1 - substituted-5-nitro-2-imidazolecarboxamidoxime, O-(loweralkyl carbonates). Other compounds are also described. The compounds are useful for controlling protozoan and bacterial infections. They are also useful as herbicides and as intermediates in preparing other nitroimidazolyl heterocycles useful for controlling microorganisms in warm-blooded animals.

SUMMARY OF THE INVENTION

This invention relates to novel organic compounds. More particularly, it relates to substituted nitroimidazoles, methods of preparation and the use of such compounds.

The compounds of the present invention may be illustrated by the following formula:

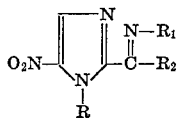

wherein R is loweralkyl, hydroxyloweralkyl, or loweralkanoyloxyloweralkyl; $R_1$ is hydrogen, hydroxy, cyano, loweralkanoyloxy, or loweralkoxycarbonyloxy; $R_2$ is chlorine, bromine, amino, monoloweralkylamino, or diloweralkylamino, with the provisos that when $R_1$ is loweralkanoyloxy or loweralkoxycarbonyloxy then R is loweralkyl or loweralkanoyloxyloweralkyl; when $R_2$ is monoloweralkylamino or diloweralkylamino, then $R_1$ is hydrogen; when $R_2$ is chlorine or bromine then $R_1$ is hydroxy; and when $R_1$ is hydroxy and $R_2$ is chlorine or bromine, then R is loweralkyl or loweralkanoyloxyloweralkyl; and, in the case of the amidines, the acid salts thereof.

This invention relates to a novel method for the preparation of the above compounds and to the use of such compounds as antibacterial or antiprotozoal agents in the treatment of warm-blooded animals or as intermediates in the preparation of useful antimicrobial agents. Advantageously, these compounds are also useful as herbicidal agents.

In accordance with the present invention, compounds of the formula:

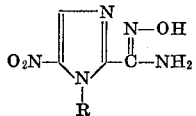

where R is loweralkyl ($C_1$–$C_4$), hydroxyloweralkyl ($C_1$–$C_4$) or loweralkanoyloxyloweralkyl, in which the alkanoyl is $C_1$–$C_4$ and the alkyl is $C_1$–$C_4$, can be prepared by the reaction of a 2-cyano-1-substituted-5-nitroimidazole with hydroxylamine. The reaction is generally carried out in a loweralkyl alcohol such as methanol, ethanol, isopropanol, butanol or the like at a temperature between about 50° C. and 100° C. Graphically this reaction may be shown as follows:

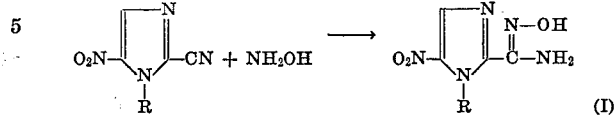

Treatment of the imidazolecarboxamidoxime (I), where R is loweralkyl or loweralkanoyloxyloweralkyl, with a loweralkyl haloformate at an elevated temperature, for example, between about 75° C. and 150° C. and in the presence of a non-reactive base or acid acceptor such as pyridine or triethylamine, yields the O-alkylcarbonate of the imidazolecarboxamidoxime of Formula II. Similar treatment with a loweralkanoyl halide or loweralkanoyl anhydride gives the O-loweralkanoyl derivative of the imidazolecarboxamidoxime. These reactions are graphically illustrated as follows:

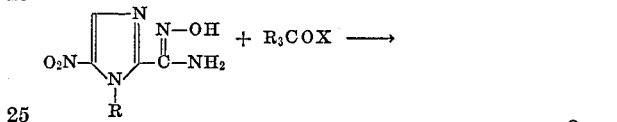

where R is loweralkyl ($C_1$–$C_4$) or loweralkanoyloxyloweralkyl; X is halogen, preferably chlorine or bromine and $R_3$ is loweralkoxy or loweralkyl such as methoxy, ethoxy, propoxy, isopropoxy, butoxy, methyl, ethyl or isobutyl.

The imidazolecarbonylhalide oximes (III) having the formula:

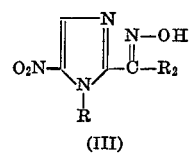

where R is a loweralkyl or loweralkanoyloxyloweralkyl and $R_2$ is chlorine or brmoine, can be prepared by allowing an imidazolecarboxaldehyde oxime of the formula:

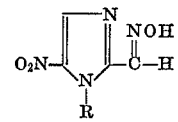

where R is loweralkyl or loweralkanoyloxyloweralkyl, to react with chlorine, bromine or a source of positive halogen such as N-chloro- or N-bromosuccinimide, at a temperature between about 0° C. and 75° C. and preferably between 20° C. and 30° C. in the presence of either an inert organic solvent such as a chlorinated hydrocarbon, dimethyl sulfoxide, dimethylformamide and the like, or hydrochloric acid.

When an imidazolecarboximidate (IV) of the formula:

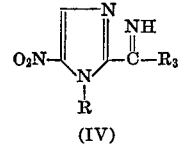

(IV)

where $R_3$ is loweralkoxy ($C_1$–$C_4$) and R is loweralkyl, hydroxyloweralkyl or loweralkanoyloxyloweralkyl is treated with an ammonium salt in the presence of a loweralkyl alcohol such as methanol, ethanol or butanol and the reaction is carried out at a temperature between about 50° C. and 100° C., the acid salt of an imidazolecarboxamidine of the following Formula V is obtained:

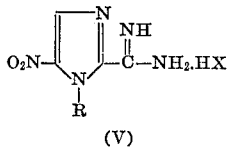

(V)

where R is as stated immediately above and X is an acid anion such as chloride or bromide. Formula V compounds where R is hydroxyethyl can be obtained by a similar reaction but using the cyclic imidate:

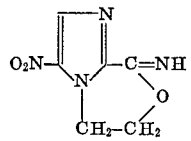

Compounds which have the formula:

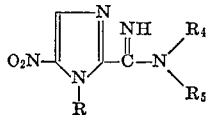

where $R_4$ and/or $R_5$ are lower alkyl can be prepared by allowing the aforementioned imidates to react with the corresponding acid salts of primary or secondary amines of the formula:

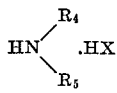

where at least one of $R_4$ or $R_5$ is loweralkyl ($C_1$-$C_4$) and the other is either loweralkyl ($C_1$-$C_4$) or halogen and X is as defined above.

Reaction of the aforementioned imidates with cyanamide affords N'-cyanocarboxamidines of the formula:

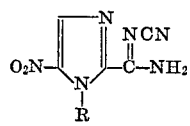

where R is loweralkyl, hydroxyloweralkyl, or loweralkanoyloxy lower alkyl.

The compounds of the instant invention are effective for controlling protozoan and bacterial infections in warm-blooded animals. They may be administered to said hosts in their diet or drinking water or may be given in the form of pills, tablets, boluses, capsules, powders, as a drench or by injection. Preferably, the compounds are admixed with the feed and administered in this manner. Usually about 50 to 1000 p.p.m. and preferably about 100 to 500 p.p.m. of active ingredient is effective when offered in the diet. In practice it has also been found that 25 to 100 mg./kg. of body weight of the active compounds is effective for controlling *Trichomonas vaginalis* when administered as a single oral dose. Multiple doses, however, may also be given without adverse effects.

In addition to this activity it has also been found that the present compounds are effective herbicides. They are active against both broadleaf weeds and grasses and may be employed either pre- or post-emergence. That is to say that they are effective for controlling undesirable plant species when applied to soils containing seeds of such plants or when applied to the foliage of undesirable plants.

For herbicide use the compounds of this invention are generally prepared as wettable powders, emulsifiable concentrates, dusts or granular formulations.

In addition, many of the compounds of this invention are useful as intermediates for the preparation of nitroimidazolyl heterocycles useful for controlling microorganisms in warm-blooded animals. For example, the amidoximes and the halooximes can be converted to certain 3 - (1 - substituted - 5 - nitro-2-imidazolyl) - 1,2,4-oxadiazoles, which are antimicrobial agents.

SPECIFIC DISCLOSURE

The following examples describe in detail the preparation of representative compounds of this invention and their use as described hereinbefore.

EXAMPLE 1

Preparation of 1-methyl-5-nitro-2-imidazolecarboxamidine and its acid salts

A mixture of 1.98 g. (0.01 mole) of ethyl 1-methyl-5-nitro-2-imidazolecarboximidate and 0.54 g. (0.01 mole) of anhydrous ammonium chloride in 45 ml. of methanol is heated at reflux temperature for 3.5 hours. Methanol is removed under reduced pressure until solid formation occurs. The reaction mixture is then cooled in ice, diluted with 50 ml. of ether and the precipitate is collected and washed with ether. Drying gives 1.1 g. of 1-methyl-5-nitro-2-imidazolecarboxamidine hydrochloride, which is recrystallized from pyridine to give a white powder, melting point 243°–244° C. (dec.).

Alternatively, 19.55 g. (0.106 mole) of methyl 1-methyl-5-nitroimidazolecarboximidate and 15 g. (0.28 mole) of anhydrous ammonium chloride are heated in 250 ml. of methanol at reflux temperature for 9 hours. The mixture is then evaporated to dryness and 100 ml. of dry dimethylformamide is added. The mixture is warmed to about 50° C. for 10 minutes, filtered, and the filtrate is evaporated to give a paste. Acetone is added to the paste and the insoluble white solid is collected and washed well with acetone. This gives 18 g. (83%) of 1-methyl-5-nitro-2-imidazolecarboxamidine hydrochloride, melting point 240–241° C. (dec.). The free base is obtained by dissolving the amidine salt in water, neutralizing the solution with sodium carbonate and extracting the solution with chloroform. Evaporation of the chloroform extracts to dryness affords 1-methyl-5-nitro-2-imidazolecarboxamidine, melting point 147° C.

The compound N-(n-propyl)-1-methyl-5-nitro-2-imidazolecarboxamidine hydrochloride is prepared in the above manner by substituting n-propylamine hydrochloride for ammonium chloride. N,N - dimethyl-1-methyl-5-nitro-2-imidazolecarboxamidine hydrochloride is prepared in the same fashion by the substitution of dimethylamine hydrochloride for ammonium chloride. N-ethyl-N-butyl-1-methyl-5-nitro-2-imidazolecarboxamidine hydrobromide is likewise prepared when ethylbutylamine hydrobromide is substituted for ammonium chloride. Use of ammonium acetate, ammonium trifluoroacetate, ammonium propionate, ammonium sulfate, or ammonium methanesulfonate in place of ammonium chloride affords the acetate, trifluoroacetate, propionate, sulfate, and methanesulfonate salts, respectively, of the title compound.

EXAMPLE 2

Preparation of 1-methyl-5-nitro-2-imidazolecarboxamidoxime

A solution which contains 15.2 g. (0.1 mole) of 2-cyano-1-methyl-5-nitroimidazole in 100 ml. of ethanol is heated to reflux temperature with a mixture of 6.95 g. (0.1 mole) of hydroxylamine hydrochloride and 5.6 g. (0.1 mole) of potassium hydroxide in 300 ml. of 95% ethanol. After 10 minutes, the mixture is cooled, and the yellow 1-methyl-5-nitro-2-imidazole carboxamidoxime is collected, washed with water and dried. The yield is 15.7 g. (85%), melting point 238°–240° C.

EXAMPLE 3

Preparation of 1-methyl-5-nitro-2-imidazolecarbonyl chloride oxime

Method A.—A slurry of 15 g. (0.088 mole) of 1-methyl-5-nitro-2-imidazolecarboxaldehyde oxime in 300 ml. of chloroform is allowed to react with chlorine, which is bubbled into the reaction mixture until the infrared spectrum of an evaporated sample shows none of the characteristic oxime band at 1200 cm.$^{-1}$ (total time of about 13.5 hours). The mixture is then evaporated to dryness to afford a solid, which is collected and washed with water. This gives 14.6 g. (79%) of 1-methyl-5-nitro-2-imidazolecarbonyl chloride oxime, melting point 192°–193° C. (dec.).

Method B.—Alternatively, 17 g. (0.1 mole) of 1-methyl-5-nitroimidazolecarboxaldehyde oxime is suspended in 200 ml. of 8 N hydrochloric acid at 5–10° C. and chlorine is bubbled into the reaction mixture for 40 minutes. The mixture is allowed to rise gradually to room temperature after the chlorine flow is terminated, and a solution is obtained. The solution is poured on ice and the precipitate is collected and washed well with water. This gives 17.15 g. (84%) of 1-methyl-5-nitro-2-imidazolecarbonyl chloride oxime, melting point 196.5–197° C., (dec.).

Similarly, 1-ethyl, 1-butyl and 1-(2-acetoxyethyl)-5-nitro-2-imidazolecarbonyl chloride oxime are prepared by allowing the corresponding oximes to react with chlorine as described in Method A.

EXAMPLE 4

Preparation of 1-methyl-5-nitro-2-imidazole-carboxamidoxime, O-(ethyl carbonate)

A mixture of 5.1 g. (0.028 mole) of 1-methyl-5-nitro-2-imidazolecarboxamidoxime and 4.35 g. (0.055 mole) of pyridine is heated to reflux temperature in 100 ml. of tetrahydrofuran (THF) and 3.8 g. (0.035 mole) of ethyl chloroformate in 20 ml. of THF is added. A white precipitate forms rapidly and after 2 hours, the mixture is cooled, filtered, and the filter cake is washed with THF. The filtrate is evaporated to dryness under reduced pressure to afford a solid, which is washed with water and collected. This solid is recrystallized from acetone-hexane to give 1-methyl-5-nitro-2-imidazolecarboxamidoxime, O-(ethyl carbonate); the pure product melts at 139°–140° C.

EXAMPLE 5

Preparation of 1-(2-hydroxyethyl)-5-nitro-2-imidazolecarboxamidine and its acid salts In the manner described in Example 1, the following cyclic imidate:

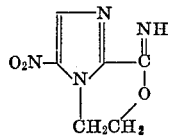

is allowed to react with an excess amount of anhydrous ammonium chloride in methanol to afford 1-(2-hydroxyethyl) - 5 - nitro - 2 - imidazolecarboxamidine hydrochloride. The acid-free amidine is obtained by neutralizing the amidine salt with sodium carbonate in water, extracting the aqueous mixture with chloroform, and evaporating the chloroform extract to dryness.

1-ethyl, 1-(n-propyl), 1-(2-acetoxyethyl), and 1-(2-propionyloxyethyl) - 5 - nitroimidazolecarboxamidine hydrochlorides are also obtained by treating the ethyl imidates of 1-ethyl, 1-(n-propyl), 1-(2-acetoxyethyl), and 1-2-propionyloxyethyl)-5-nitro - 2 - imidazolecarboximidic acid, respectively, with ammonium chloride by the procedure of Example 1. The corresponding hydrobromides are prepared by substituting ammonium bromide for ammonium chloride. Use of ammonium acetate, ammonium trifluoroacetate, ammonium propionate, ammonium sulfate, or ammonium methanesulfonate in place of ammonium chloride affords the corresponding amidine acid salts.

The aforementioned ethyl imidates of 1-substituted-5-nitro-2-imidazolecarboximidic acids are readily prepared by stirring the corresponding 2-cyanoimidazoles in ethanol at room temperature and adding a catalytic amount of potassium t-butoxide or sodium ethoxide. The imidates are then isolated by concentrating the alcohol mixtures under reduced pressure and collecting the solid products.

EXAMPLE 6

Preparation of 1-(2-hydroxyethyl)-5-nitro-2-imidazolecarboxamideoxime

The compound 2-cyano-1-(2-hydroxyethyl)-5-nitroimidazole is allowed to react with an equimolar quantity of hydroxylamine, as described in Example 2, to give 1-(2-hydroxyethyl)-5-nitro-2-imidazolecarboxamidoxime.

1-ethyl-, 1-(n-propyl), and 1-(2-acetoxyethyl)-5-nitro-2-imidazolecarboxamidoximes are also prepared in the manner described in Example 2 by adding an equimolar amount of hydroxylamine to 1-ethyl-, 1-(n-propyl), and 1-(acetoxyethyl)-2-cyano-5-nitroimidazole, respectively. 1 - (2-acetoxyethyl)-5-nitro-2-imidazolecarboxamidoxime melts at 116–118° C. while 1-ethyl-5-nitro-2-imidazolecarboxamidoxime melts at 120.5–122.5° C.

EXAMPLE 7

Preparation of 1-methyl-5-nitro-2-imidazolecarboxamidoxime, O-acetate

A mixture of 7.8 g. (0.1 mole) of acetyl chloride and 1-methyl-5-nitro-2-imidazolecarboxamidoxime in 900 ml. of benzene is heated under reflux for an overnight period, cooled, and the title compound is collected by filtration. It is recrystallized from aqueous ethanol.

Alternatively, 1-methyl-5-nitro-2-imidazolecarboxamidoxime (0.2 g., 1.1 mmole) is heated in 5 ml. of acetic anhydride at reflux temperature for 10 minutes, cooled, and the pale-yellow crystals are collected and washed with ether. The title compound melts at 177–179° C.

Similarly, 1-ethyl, 1-(2-acetoxyethyl), and 1-(n-propyl)-5-nitro-2-imidazolecarboxamidoxime are heated in acetic anhydride to afford 1-ethyl, 1-(2-acetoxyethyl), and 1 - (n-propyl)-5-nitro-2-imidazolecarboxamidoxime, O-acetates, respectively. Substitution of propionic anhydride for acetic anhydride affords the corresponding imidazolecarboxamidoxime, O-propionates.

EXAMPLE 8

Preparation of 1-ethyl-5-nitro-2-imidazolecarboxamidoxime, O-(ethylcarbonate)

The compound 1-ethyl-5-nitro-2-imidazolecarboxamidoxime is allowed to react with ethyl chloroformate in the manner described in Example 4 to afford 1-ethyl-5-nitro-2-imidazolecarboxamidoxime, O-(ethyl carbonate).

1-(n-propyl)- and 1-(2-acetoxyethyl)-, 1-methyl, 1-ethyl-5-nitro-2-imidazolecarboxamidoximes, O - (propyl carbonates), are prepared by reacting the respective amidoximes with propyl chloroformate in the manner described in Example 4, while 1-(n-propyl)- and 1-(2-acetoxyethyl)-5-nitro-2-imidazolecarboxamidoxime, O - (ethyl carbonates), are prepared by using ethyl chloroformate, instead.

EXAMPLE 9

Preparation of 5-amino-3-(1-methyl-5-nitro-2-imidazolyl)-1,2,4-oxadiazole

A mixture of 0.47 g. (5 mmole) of guanidine hydrochloride in 5 ml. ethanol is stirred while 0.27 g. (5 mmole) of sodium methylate in 3 ml. of ethanol is added as a paste. To this is added 0.51 g. (2.5 mmoles) of 1-methyl-5-nitro-2-imidazolecarbonyl chloride oxime in 7 ml. of ethanol, and stirring is continued at room temperature for 2.5 hours. The mixture is then refluxed 0.5 hour and evaporated to dryness under reduced pressure to give a brown residue. Water is added to the residue and the insoluble solid is colected. Recrystallization of this material from ethanol affords 5-amino-3-(1-methyl-5-nitro-2-imidazolyl)-1,2,4-oxadiazole, melting point 268° C. The pure product melts at 286.5–289° C. (dec.).

The same product is obtained from the reaction of the above nitroimidazolecarbonyl chloride oxime with cyanamide in the presence of triethylamine. It also arises from the treatment of 1-methyl-5-nitro-2-imidazolecarboxamidoxime with trichloroacetic anhydride, in trichloroacetic acid as solvent, at an elevated temperature, which yields 5 - trichloromethyl-3-(1-methyl-5-nitro-2-imidazolyl)-1,2,4-oxadiazole. The latter compound upon reaction with ammonia in an alcoholic solvent at room temperature gives the title compound.

EXAMPLE 10

Preparation of N'-cyano-1-methyl-5-nitro-2-imidazolecarboxamidine

A solution which contains 7.29 g. (0.0368 mole) of ethyl 1-methyl-5-nitro-2-imidazolecarboximidate in 90 ml. of methanol is heated at reflux with 1.692 g. (0.0403 mole) of cyanamide for 3 hours. During the refluxing, crystallization of the title compound occurs. The mixture is cooled in an ice bath, and the crystals are collected and washed with cold methanol. The yield of N'-cyano-1-methyl-5-nitro-2-imidazolecarboxamidine is 6.1 g. (85.3%), melting point 272–275° C.

N'-cyano-1-ethyl-, N'-cyano-1-(2-hydroxyethyl)-, N'-cyano-1-(2-acetoxyethyl) and N'-cyano-1-(n-propyl)-5-nitro-2-imidazolecarboxamidines are prepared in the above manner by allowing the corresponding ethyl imidates of 1-ethyl, 1-(2-acetoxyethyl)-, and 1-(n-propyl)-5-nitro-2-imidazolecarboximidic acid, and the cyclic imidate, shown below, to react with cyanamide.

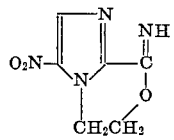

EXAMPLE 11

Preparation of 1-methyl-5-nitro-2-imidazolecarbonyl bromide oxime

A solution containing 1.7 g. (0.01 mole) of 1-methyl-5-nitro-2-imidazolecarboxaldehyde oxime in 20 ml. of dimethylformamide is stirred at room temperature while 8.9 g. (0.05 mmole) of N-bromosuccinimide in 25 ml. of dimethylformamide is slowly added. After the addition is completed, the mixture is stirred for an hour. The solvent is then removed under reduced pressure and the solid is washed with water and recrystallized from ethyl acetate to afford 1-methyl-5-nitro-2-imidazolecarbonyl bromide oxime.

In a similar manner, 1-ethyl, 1-(2-acetoxyethyl)-, and 1-(n-propyl)-5-nitro-2-imidazolecarbonyl bromide oximes are prepared.

EXAMPLE 12

Test of the present compounds as post-emergence herbicides

The efficacy of the compounds of the present invention as post-emergence herbicides is demonstrated by the following test wherein the compound 1-methyl-5-nitro-2-imidazolecarbonylchloride oxime is dispersed in a 50/50 acetone water mixture and sprayed on seedling plants of a variety of monocatyledonous and dicatyledonous plants. Spraying is sufficient to provide the equivalent of 10 lbs. per acre of active ingredient. After spraying the treated plants are placed in the greenhouse on benches and cared for until the test is terminated. After three weeks all plants are examined and the results are recorded. In this test with the above named compound applied at 10 lbs. per acre, complete kill of lambsquarters, mustard, crabgrass and wild oats is obtained. Trace injury is observed on barnyard grass, wheat and tomatoes and moderate injury is noted on pigweed.

EXAMPLE 13

Test of present compounds as pre-emergence herbicides

The pre-emergence herbicidal activity of the compounds of the invention is shown by the following tests wherein the compounds:

1-methyl-5-nitro-2-imidazolecarboxamidine hydrochloride
1-methyl-5-nitro-2-imidazolecarboxamidoxime and
1-methyl-5-nitro-2-imidazolecarboxamidoxime, O-(ethylcarbonate)

are individually dispersed in 50/50 acetone-water mixtures and applied to seeded cups containing planted seeds of mustard, millet, wheat and radishes. Applications are sufficient to provide the equivalent of 25 lbs. per acre of active ingredient and after treatment the seeded cups are placed in the greenhouse and cared for in the usual manner until the tests are complete Three weeks after treatment all cups are examined and the effect of the treatments noted.

While in all tests wheat is uninjured by the treatments, an 80% reduction in stand of mustard, 70% reduction in millet and 50% reduction in radishes is noted with 1 - methyl-5-nitro-2-imidazolecarboxamidine hydrochloride. 1-methyl-5-nitro-2-imidazolecarboxamidoxime is found to give complete kill of mustard and reduce the radish stand to 50 percent and 1-methyl-5-nitro-2-imidazolecarboxamidoxime, O-(ethyl carbonate) produces a 70% reduction in the mustard stand and 30 percent reduction of radishes.

EXAMPLE 14

Utilization of compounds of the present invention in controlling *Trichomonas vaginalis* infections This example demonstrates the efficacy of the compounds of the present invention or of compounds derived from them against *Trichomonas vaginalis* infections. Mice in groups of ten or fifteen are inoculated with 50,000 culture-derived *Trichomonas vaginalis* (Thoms strain). Test compounds are administered in a single oral dose by gavage one day after inoculation, and six days after inoculation scrapings from the subcutaneous sites of inoculation are searched microscopically for motile trichomonads. Antitrichomonal activity is concluded in those instances where motile trichomonads are eliminated from lesions present at the site of inoculation.

Mouse body weight grain from day 1 to day 6 post-inoculation shows that the compounds are well tolerated by the animals ingesting same.

The results of the test are set forth in the following table.

TABLE

| Compound | Dose mg./kg. | Total mice tested | Cleared |
|---|---|---|---|
| 5-amino-3-(1-methyl-5-nitro-2-imidazolyl-1,2,4-oxadiazole. | 100 | 15 | 15 |
|  | 50 | 10 | 10 |
|  | 25 | 10 | 10 |
| 1-methyl-5-nitro-2-imidazolecarbonyl-chloride oxime. | 100 | 5 | 4 |
|  | 50 | 5 | 0 |
| 1-methyl-5-nitro-2-imidazolecarboxamidine hydrochloride. | 100 | 5 | 4 |
|  | 50 | 10 | 4 |
| 1-methyl-5-nitro-2-imidazolecarboxamidoxime. | 100 | 5 | 4 |
|  | 50 | 5 | 2 |
| 1-methyl-5-nitro-2-imidazolecarboxamidoxime, O-(ethylcarbonate). | 100 | 20 | 16 |
|  | 50 | 10 | 7 |
| N'-cyano-1-methyl-5-nitro-2-imidazolecarboxamidine. | 100 | 5 | 5 |
|  | 50 | 10 | 5 |

EXAMPLE 15

Preparation of N-ethyl-1-ethyl-5-nitro-2-imidazole-carboxamidine and its acid salts In the manner described in Example 1, methyl 1-ethyl-5-nitro-2-imidazolecarboximidate is allowed to react with excess ethylamine hydrochloride in methanol to afford N-ethyl-1-ethyl-5-nitro-2-imidazolecarboxamidine hydrochloride. The acid-free amidine is obtained by neutralizing its acid salt with sodium carbonate as in Example 1.

The compounds N-ethyl-1-(n-butyl)- and N-ethyl-1-(2-acetoxyethyl)-5-nitro - 2 - imidazolecarboxamidine hydrochloride are also prepared in the same manner from ethyl-1-(n-butyl)- and methyl - 1 - (2-acetoxyethyl)-5-nitro-2-imidazolecarboximidate, respectively. N-ethyl - 1 - (2-hydroxyethyl)-5-nitro-2-imidazolecarboxamidine hydrochloride is prepared from the cyclic imidate:

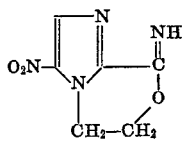

in the same manner.

EXAMPLE 16

Preparation of N,N-dimethyl-1-ethyl-5-nitro-2-imidazolecarboxamidine hydrochloride (or hydrobromide)

Methyl 1-ethyl-5-nitro-2-imidazolecarboximidate (1.96 g.) is refluxed with 2.43 g. of dimethylamine hydrochloride (or hydrobromide) in 10 ml. of methanol in the manner described in Example 1 to afford N,N-dimethyl-1-ethyl-5-nitro-2-imidazolecarboxamidine hydrochloride (or hydrobromide).

Similarly, N,N-dimethyl-1-(2-acetoxyethyl)- and N,N-dimethyl - 1 - (n-butyl)-5-nitro-2-imidazolecarboxamidine hydrochloride are prepared from their corresponding methylimidates. N,N-dimethyl-1-(2-hydroxyethyl)-5-nitro-2-imidazolecarboxamidine hydrochloride is prepared from the cyclic imidate:

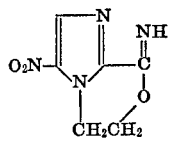

in the above manner.

EXAMPLE 17

Utilization of compounds of the present invention in controlling fowl typhoid

Groups of one-day old sex-linked pullet chicks are infected orally by gavage with 0.5 ml. of a $10^{-2}$ dilution of a five-hour Trypticase Soy Broth culture of *Salmonella gallinarum*, the causative agent of fowl typhoid. Each chick received approximately $6 \times 10^5$ viable cells.

Medication is administered continuously in the feed, beginning 3 hours before infection and continuing for 10 days, at which time the test is terminated and the number of survivors in each group recorded. The results are compared with two control groups of chicks, the first group comprising 20 chicks which are infected and untreated, and the second group comprising 10 chicks which are uninfected and untreated. The results of the test are set forth in the following table:

TABLE

| | Dose, percent | Total chicks tested | Survivors |
|---|---|---|---|
| Compound: | | | |
| N'-cyano 1-methyl-5-nitro-2-imidazolecarboxamidine | 0.1 | 5 | 4 |
| Control: | | | |
| Infected—untreated | | 20 | 0 |
| Uninfected—untreated | | 10 | 10 |

What is claimed is:

1. A nitroimidazole of the formula:

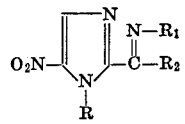

wherein R is selected from the group consisting of loweralkyl, hydroxyloweralkyl and loweralkanoyloxyloweralkyl; $R_1$ is selected from the group consisting of hydrogen, hydroxy, cyano, loweralkanoyloxy and loweralkoxycarbonyloxy; $R_2$ is selected from the group consisting of chlorine, bromine, amino, monoloweralkylamino and diloweralkylamino, with the provisos that when $R_1$ is selected from the group consisting of loweralkanoyloxy and loweralkoxycarbonyloxy, then R is selected from the group consisting of loweralkyl and loweralkanoyloxyloweralkyl; when $R_2$ is selected from the group consisting of monoloweralkylamino and diloweralkylamino, then $R_1$ is hydrogen; when $R_2$ is selected from the group consisting of chlorine and bromine, then $R_1$ is hydroxy; and when $R_1$ is hydroxy and $R_2$ is selected from the group consisting of chlorine and bromine, then R is selected from the group consisting of loweralkyl and loweralkanoyloxyloweralkyl; and in the instance of the amidines, the acid salts thereof.

2. A nitroimidazole according to claim 1, in which the compound has the formula:

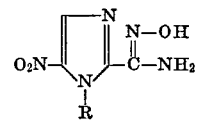

wherein R is loweralkyl, loweralkanoyloxyloweralkyl or hydroxyloweralkyl.

3. A nitroimidazole according to claim 1, in which the compound has the formula:

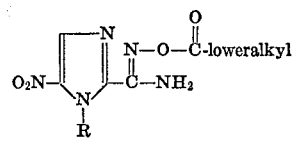

wherein R is loweralkyl or loweralkanoyloxyloweralkyl.

4. A nitroimidazole according to claim 1, in which the compound has the formula:

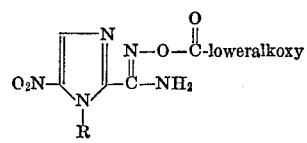

wherein R is loweralkyl or loweralkanoyloxyloweralkyl.

5. A nitroimidazole according to claim 1, having the formula:

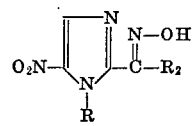

wherein R is lower alkyl or loweralkanoyloxyloweralkyl and $R_2$ is chlorine or bromine.

6. A nitroimidazole according to claim 1, having the formula:

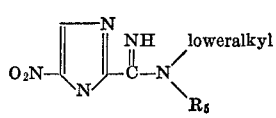

wherein $R_5$ is loweralkyl or hydrogen and R is loweralkyl, hydroxyloweralkyl, or loweralkanoyloxyloweralkyl and the acid salts thereof.

7. The nitroimidazole according to claim 1, 1-methyl-5-nitro-2-imidazolecarboxamidine hydrochloride.

8. The nitroimidazole according to claim 1, 1-methyl-5-nitro-2-imidazolecarboxamidoxime.

9. The nitroimidazole according to claim 1, 1-methyl-5-nitro-2-imidazolecarbonyl chloride oxime.

10. The nitroimidazole according to claim 1, 1-methyl-5-nitro-2-imidazolecarboxamidoxime, O-(ethyl carbonate).

11. The nitroimidazole according to claim 1, N'-cyano-1-methyl-5-nitro-2-imidazolecarboxamidine.

References Cited

UNITED STATES PATENTS

| | | | |
|---|---|---|---|
| 3,084,170 | 4/1963 | Von Esch et al. | 260—347.4 |
| 3,272,828 | 9/1966 | Von Esch et al. | 260—295 |
| 3,084,171 | 4/1963 | Von Esch et al. | 260—347.7 |
| 3,097,214 | 7/1963 | Von Esch et al. | 260—347.7 |
| 3,347,874 | 10/1967 | Eloy et al. | 260—347.7 |
| 3,427,329 | 2/1969 | Burch | 260—347.7 |

HENRY R. JILES, Primary Examiner

G. T. TODD, Assistant Examiner

U.S. Cl. X.R.

424—273